United States Patent [19]

Vajtay

[11] Patent Number: 4,897,030

[45] Date of Patent: Jan. 30, 1990

[54] APPARATUS FOR LENGTHWISE FOLDING THERMOPLASTIC STRIP MATERIAL

[75] Inventor: Thomas L. Vajtay, Somerset, N.J.

[73] Assignee: SLM Manufacturing Corporation, Somerset, N.J.

[21] Appl. No.: 234,665

[22] Filed: Aug. 22, 1988

Related U.S. Application Data

[62] Division of Ser. No. 1,283, Jan. 8, 1987, Pat. No. 4,780,261.

[51] Int. Cl.⁴ .................. B29C 53/06; B29C 59/02
[52] U.S. Cl. .................... 425/384; 219/243;
264/284; 264/285; 264/293; 264/294; 264/295;
264/339; 264/DIG. 46; 264/DIG. 66; 425/385;
425/391; 425/394; 425/397; 425/DIG. 13;
425/DIG. 55; 425/186
[58] Field of Search ............... 425/299, 304, 383, 384,
425/385, 390–392, 397, DIG. 38, DIG. 39,
DIG. 55, DIG. 13, 506–512, DIG. 244, 186;
264/280, 285, 293–296, 22, 339, 282, 284, DIG.
4, DIG. 46, DIG. 66; 493/395–400, 405;
65/111; 219/243, 228; 83/15, 170, 171, 16;
150/257, 268

[56] References Cited

U.S. PATENT DOCUMENTS

| | | | |
|---|---|---|---|
| 2,706,239 | 4/1955 | Blaser | 83/170 |
| 2,848,751 | 8/1958 | Vernon | 264/285 |
| 3,245,772 | 4/1966 | Cypher et al. | 65/111 |
| 3,281,516 | 10/1966 | Southwick | 264/285 |
| 3,379,814 | 4/1968 | Bracey, Jr. | 425/385 |
| 3,447,486 | 6/1969 | Wooding et al. | 425/DIG. 55 |
| 3,465,627 | 9/1969 | Vigneault | 83/171 |
| 3,479,424 | 11/1969 | Engel | 264/322 |
| 3,900,550 | 8/1975 | Oliver et al. | 264/339 |
| 3,953,056 | 4/1976 | Roberts | 264/295 |
| 4,147,488 | 4/1979 | Chiron | 425/DIG. 13 |
| 4,153,665 | 5/1979 | Vecchiotti et al. | 264/295 |
| 4,179,252 | 12/1979 | Seufert | 425/384 |
| 4,329,307 | 5/1982 | Westcott et al. | 425/384 |

FOREIGN PATENT DOCUMENTS

| | | | |
|---|---|---|---|
| 1800395 | 5/1970 | Fed. Rep. of Germany | 264/145 |
| 49-44594 | 11/1974 | Japan | 156/257 |
| 55-21218 | 2/1980 | Japan | 264/285 |
| 55-152020 | 11/1980 | Japan | 156/257 |
| 56-13138 | 2/1981 | Japan | 264/146 |
| 57-183 | 1/1982 | Japan | 156/257 |
| 60-24930 | 2/1985 | Japan | 425/383 |
| 60-78722 | 5/1985 | Japan | 425/383 |
| 638428 | 9/1983 | Switzerland | 264/285 |

Primary Examiner—Jeffery Thurlow
Assistant Examiner—Mathieu Vargot
Attorney, Agent, or Firm—Sughrue, Mion, Zinn, Macpeak & Seas

[57] ABSTRACT

A flat stock strip of thermoplastic material is passed through a heating station in contact with the edges of longitudinally oriented heated knife blades to heat soften the stock strip along narrow longitudinal lines to define localized fold lines for the stock strip. The strip is fed sequentially through a prebending device and a chilled forming die to set the reformed strip at the fold lines. Preferably the knife blades and any strip contact surfaces of the prebending device and the chilled forming die are PTFE covered to eliminate scratching of the thermoplastic stock strip material during heating, reforming and cooling.

9 Claims, 3 Drawing Sheets

APPARATUS FOR LENGTHWISE FOLDING THERMOPLASTIC STRIP MATERIAL

This is a division of application Ser. No. 07/001,283, filed January 8, 1987, now U.S. Pat. No. 4,780,261.

FIELD OF THE INVENTION

This invention relates to thermal forming of thermoplastic strip material with lengthwise folds and more particularly to the forming of sharp folds by localized, line heating of the thermoplastic sheet material, folding of the strip material along one or more heat-softened fold lines and cooling the folded strip to set the folds.

BACKGROUND OF THE INVENTION

In the packaging and tubular container art, packages have been formed by creating a tube having flexible sidewalls, formed of a thermoplastic material such as polyvinyl chloride (PVC) approximately 0.005 to 0.02 inches in thickness, held to a preformed or desired shape such as a polygon by coupling to the ends of the tube rigid end caps. The end caps employed in such packages or containers as evidenced by U.S. Pat. No. 3,986,659, issued October 19, 1986, entitled "END CAPS FOR TUBULAR CONTAINERS", and U.S. Pat. No. 3,913,774, issued October 21, 1975, entitled "END CAPS FOR CONTAINERS", are formed of a plastic material by molding to create rigid end members providing strength and rigidity to the package or container. The dimensions and shape of the end caps conform to the dimensions and shape of the flexible sides of the tube and the end caps include a base portion substantially forming an end cover for the container tube and sidewalls. The end caps also have engaging means for interlocking with perforations within opposed flexible sides of the tubes such that the projections extending outwardly of the sidewalls and within the perforations achieve a positive mechanical lock for holding the end caps to the container or package.

In an effort to improve and lower the cost of the container, end caps have been formed from identical or similar plastic sheet material as the tube proper by transverse severing short length sections from a prefold, flexible, semi-rigid strip of thermoplastic material such as polyvinyl chloride to the required end cap length. Such tubular package end cap is the subject matter of copending application Ser. No. 816,779, filed January 7, 1986, and entitled "TUBULAR PACKAGE AND END CAP FOR SAME". In that application, the tubular package comprises a tube of sheet material of polygon cross-section having axially open ends, with the ends being closed off by suitable end caps. Each end cap is formed by a flexible semi-rigid sheet having a central portion spanning across the open end of the tube and terminating at opposite edges thereof and at right angles to the central portion in a double layer folded back portion towards the central portion defining at each side thereof parallel sidewalls defining a double layer slot for receiving the ends of respective opposed sidewalls of the polygon cross-section tube. The folded portions of the semi-rigid plastic defining the end cap outer sidewall are of a common height. In order to define a slot which is sized between the outer and inner sidewalls of the end caps equal to or very slightly smaller than the tightness of flexible tube sidewalls received thereby, the flexible, semi-rigid plastic sheet must be sharply folded under an arrangement which restores plastic memory at the crease or fold line so that the folded sheet portion strongly resists deformation and facilitates a relatively rigid connection between the end cap and the tube.

It is an object of the present invention to provide an improved method of forming a longitudinally folded thermoplastic material strip stock in which a thermoplastic material stock strip is heat softened only along desired bend lines to momentarily eliminate the memory of the plastic stock strip at selected longitudinal lines and wherein after bending, cooling of the heat-softened plastic restores the memory at the crease lines.

It is a further object of the present invention to provide a method and apparatus for longitudinally folding the plastic material stock strip, which may be of clear or translucent plastic and which is achieved without scratching the thermoplastic material during the process of localized line heating, bending and cooling by sequentially passing the stock through a heating station, a forming station and a chilled die crease line setting station.

SUMMARY OF THE INVENTION

The present invention is directed to an apparatus and method for forming short length longitudinally folded thermoplastic material stock strip sections including the steps of: passing a flat thermoplastic material stock strip through a heating station to heat the strip to a temperature sufficient to soften the plastic material; progressively folding said heatsoftened flat strip into lengthwise folded form having substantially sharp folds and; by maintaining the folded strip in folded condition by holding and pressing the strip while cooling the strip, setting the heat-softened material at the folds. The improvement resides in passing the flat thermoplastic material strip over the edge or edges of one or more longitudinally oriented heated knife blades to heat-softened the strip along narrow longitudinal lines to define localized fold lines for the strip prior to progressively fold the heat-softened flat thermoplastic material strip into lengthwise folded form.

Preferably, the thermoplastic material strip is fed between diametrically opposed knife blades to opposite sides of the strip having edges respectively contacting opposite sides of the thermoplastic material strip to locally heat the strip from opposite sides towards the center along predetermined lengthwise fold lines. To prevent scratching of the sides of the thermoplastic material strip, the knife edges are Teflon coated as well as the surfaces of the forming guides and chilling dies through which the strip is fed.

DESCRIPTION OF THE PREFERRED EMBODIMENT

Figures 1, 5A, 5B:
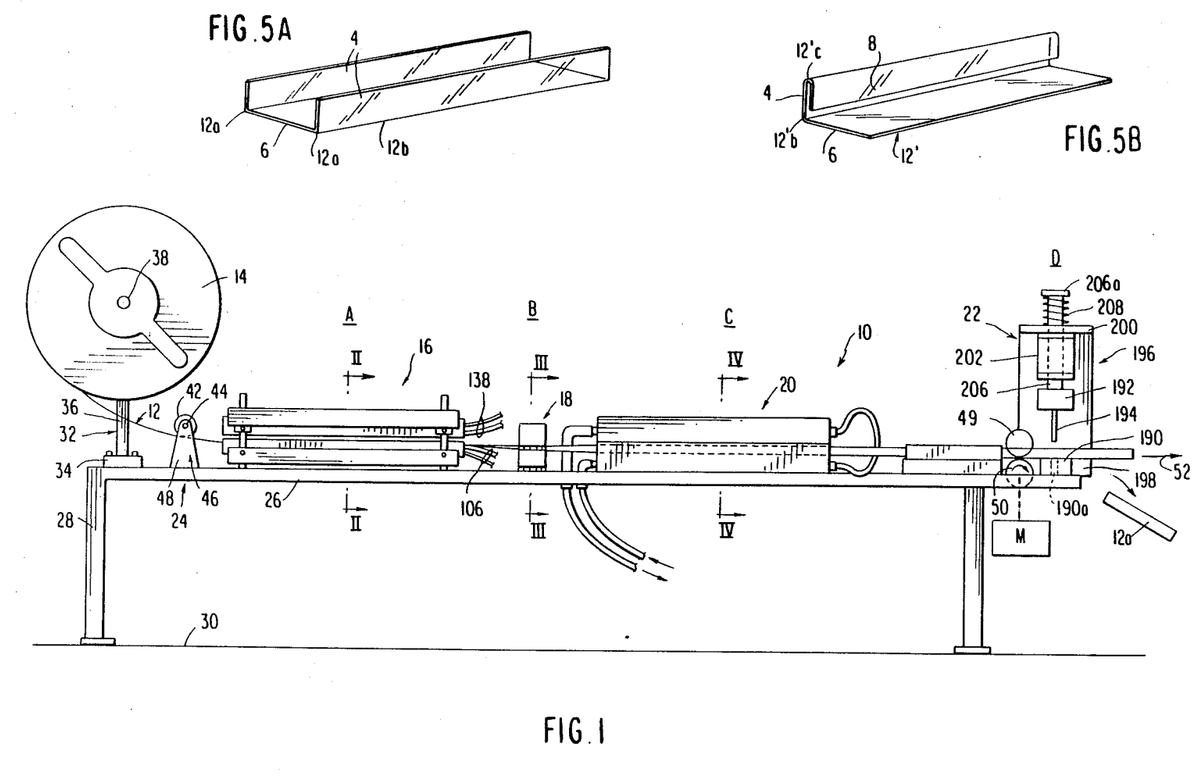
FIG. 1 is a side elevational view of an apparatus for forming longitudinally folded thermoplastic material strip sections in accordance with the method of the present invention and forming a preferred embodiment thereof.
FIGS. 5A and 5B are perspective views of sections of alternate forms of the thermoplastic material stock strip after severing by the blanking and cutting mechanism forming the downstream component of the apparatus of FIG. 1.

The invention is directed to an improved method for forming short length longitudinally folded thermoplastic material strip sections, which method is practiced by the apparatus or machine indicated generally at 10, FIG. 1. The machine 10 is adapted to receive a continuously fed, flat stock strip of thermoplastic material indicated generally at 12 from a reel 14 and which stock strip passes sequentially through four main sections of the machine consisting of a heating assembly indicated generally at 16 at station A, a forming guide section or prebending device 18 at station B, a chilled forming die 20 at station C, and a blanking and cutting mechanism indicated generally at 22 at station D.

The apparatus consists of a suitable table or bench indicated generally at 24 which includes a table top 26 supported by vertical legs 28, at opposite ends and which in turn rest on the floor 30. Mounted at one end of the table top is a roll feed stand indicated generally at 32 including a base 34 and a pedestal 36 mounting an axle 38 which projects horizontally outwardly from the pedestal 36. Mounted on the pedestal 36 is reel 14 for rotation about its axis on axle 38 and the reel 14 carries the stock strip 12 of thermoplastic material which may be polyvinyl chloride (PVC), in roll form. When used to form end caps for packages or containers as set forth in the referred to patents, the strip 12 is preferably of transparent material. It may be several inches in width. With the roll of PVC mounted on reel 14 and secured in position, the strip of thermoplastic material is fed beneath a guide roller 42 which is mounted for rotation by way of axle 44 on a guide roller stand 46 whose base 48 rests upon and is screwed or otherwise fixed to the table top 26. At station D a strip drive roller 50 is driven by an electric motor M or other drive means. A spring biased guide roll 49 frictionally engages the strip 12 sandwiching it between rolls 49, 50 to forceably drive the strip 12 in the direction of arrow 52 with rollers 49 and 50 functioning as nip rolls to pull the formed strip through the machine.

Figure 2:
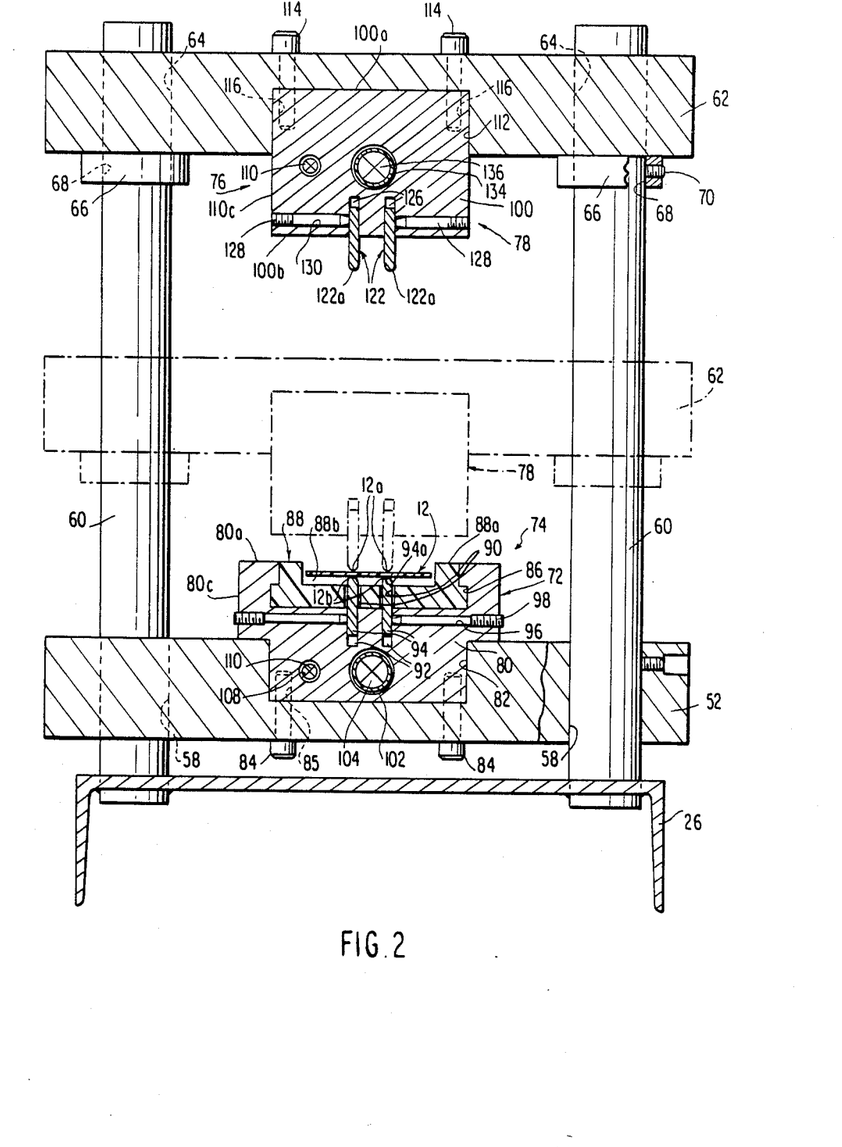
FIG. 2 is a transverse sectional view of the heating assembly of FIG. 1, taken about line II—II.

Guide roller 42, therefore, directs the flat thermoplastic material strip 12 into the heating assembly 16. The heating assembly 16, at station B, is a principal element of the apparatus 10 and constitutes a departure from the art. As seen in FIGS. 1 and 2, the heating assembly 16 comprises a flat, elongated base plate 52 which is of rectangular cross section. Screws (not shown) fixably mount the base plate 52 to the table top 26. The base plate extends longitudinally in line with assembly 46 and downstream thereof. The base plate 52 is provided with four vertical holes or bores 58 adjacent four corners thereof with a pair of holes 58 at opposite ends of the base plate and transversely in line with each other. Fixably mounted within the holes 58 of the base plates are cylindrical guide posts 60 which extend vertically upward from the base plate 52. An upper plate 62, which may be sized identically to base plate 52 and constitutes a mirror image thereof, is provided with four holes 64 slightly larger than the diameter of guide posts 60 and at corresponding corner positions within the upper plate so as to slidably receive the upper ends of the guide posts 60. As such, the upper plate 62 may be vertically raised and lowered on the guide posts 60. The guide posts 60 are each provided with a collar 66 which has a bore 68 slightly larger than the diameter of the guide posts 60 so as to slide vertically on the guide posts. A set screw 70 is threadably carried by each collar and may be adjusted radially to cause the end of each set screw to frictionally engage its guide posts 60. Thus the collars 66 are locked at given like vertical positions along the guide posts 60.

The base plate 52 is provided with a lower heating block assembly indicated generally at 72, fixably mounted to the base plate and projecting upwardly therefrom and defining with the base plate, a lower heating unit indicated generally at 74. Further, the upper plate 62 fixably supports a downwardly depending upper heating block assembly indicated generally at 76 and forms with upper plate 62 an upper heating unit 78. It is the function, therefore, of the collars 66 to support the upper heating block assembly 76 spaced slightly from the lower heating block assembly 72, as shown in dotted line position FIG. 2 with the thermoplastic material strip 12 passing therebetween.

The block assemblies 72 and 76 are generally identical and mirror images of each other. An elongated machined or cast metal bottom block 80, is of generally rectangular cross-section and has a lower portion of a lateral width equal to the width of elongated groove 82 formed within the top of the base plate 52, within which the block 80 portion rests. A number of screws 84, extending through the base plate 52 from the bottom, are threadably received by tapped holes 85 within the bottom block 80 to lock the block 80 to base plate 52. The block 80 has its upper surface 80a recessed along the full longitudinal length of the same in the form of an inverted T-shape groove 86. A TEFLON insulator and guide strip, generally indicated at 88, is slidably inserted or otherwise provided within groove 86. The TEFLON insulator and guide strip 88 is of a vertical height or thickness equal to the height of groove 86 such that the upper surface 88a of the TEFLON insulator and guide strip is flush with the upper surface 80a of block 80. Strip 88 is provided with a mirror image configuration on its lower half matching the configuration of the longitudinal groove 86 within block 80. Further, the upper surface 88a of strip 88 includes a central rectangular groove as at 88b over its longitudinal length. Both the PTFE insulator and guide strip 88 and the block 80 bear narrow vertical slots, as at 90 for strip 88 and 92 for block 80, at a number of locations, the slots being in vertical alignment and having PTFE coated metal knife blades 94 mounted therein. Further, the vertical height of the combined slots 90 and 92 are less than the vertical width of the knife blades 94 which are mounted upright therein so that the knife blade upper ends 94a project above the recess or groove 88b within the PTFE insulator and guide strip 88. Further, the upper ends 94a of the knife blades are rounded and terminate below the upper surface 88a of the Teflon insulator and guide strip 88. In order to lock the knife blades in position with their ends 94a at a given vertical height within recess 88b, block 80 is provided with horizontal bores or holes 96, extending inwardly from opposite sides 80c of block 80, to intersect vertical slots 92 within the block 80. The bores 96 hold roll pins 98 which contact the knife blades 94 to lock them at vertically adjustable positions within the slots 90 and 92 bearing the same. Further, the block 80 of the lower heating block assembly 72 (and similarly, the corresponding block 100 of upper heating block assembly 76) is formed of a heat conductive metal such as steel to facilitate heating of the knife blades carried by the two block assemblies. A longitudinal circular bore 102 is formed within the lower block 80 which receives a CALROD electrical resistance heater 104, connected to a source of electricity (not shown), via leads 106, FIG. 1. A further smaller diameter bore 108 is provided within block 80, 100, which receives a thermocouple 110 for sensing the temperature of that block bearing the same and thus provides a suitable measurement of the temperature of the PTFE coated knives 94 in thermal contact therewith and projecting upwardly therefrom and through the PTFE insulator and guide strip 88.

As mentioned previously, the upper heating block assembly 76 is a near mirror image of the lower heating block assembly 72. In that respect, the upper plate 62 includes a rectangular, longitudinal groove 112 at its center, of a width slightly larger than the width of upper heating block 100, within which groove 112 the face 100a of block 100 is positioned, being held therein by a series of mounting screws 114 whose threaded ends are received within tapped holes 116 of block 100. The opposite face 100b of the block 13 is provide with longitudinally extending laterally spaced vertical slots 126. A pair of PTFE coated knife blades 122 are mounted to the upper heating block assembly, being positioned within respective slots 126. Roll pins 128 are carried by transverse bores 130, which extend from the sides 110c of block 100 to slots 126 and function to lock the Teflon-coated knife blades 122 in position with their ends 122a extending outwardly of the outer face 100b of the upper block 100. A central longitudinal bore or hole 134 carries a CALROD heater 136, which may be identical to heater 104 and which is electrically energized via electrical leads 138, FIG. 1, from a source (not shown).

In FIG. 2 the upper heating unit 78 is shown in full lines in vertical raised position with bottom of the upper plate 62 abutting the collars 66 which function by gravity to locate the upper heating block assembly 76 relative to the lower heating block assembly 72. Positioned within the upper surface recess 88b of the PTFE insulator and guide strip 88 for the lower heating block assembly 72 is the thermoplastic material strip 12. The thermoplastic material strip 12 is in near contact along both its edges with the PTFE insulator and guide strip 88 and on its lower face with the ends 94a of the lower set of knife blades 94. With the upper heating unit 78 lowered to the dotted line position, FIG. 2, where the bottom of the upper plate 62 rests on the four collars 66 at the four corners of the heating assembly 16, the upper heating block assembly 76 is so located that the ends 122a of the upper knife blades 122 contact thermoplastic material strip 12 to the opposite side thereof from the respective lower set of knife blades 94. As will be appreciated hereinafter, during operation of the apparatus with the strip 12 moving at high speed between and in contact with the PTEE insulator and guides strip 88, the strip 12 is subject to localized line heating by the knife blades 94, 122, and the heat is diffused by heat-softening the thermoplastic material strip 12 along laterally spaced, parallel lines. This localized heating is one of the keys to the improved method for forming sharp longitudinal folds to the strip by destroying momentarily the memory of the plastic along desired fold lines, and permitting folding or bending the strip along longitudinal bend lines at the lines 12b of localized heating and subsequently chilling the localized line-softened areas of the strip while the strip is positioned within a die defining the configuration of the reformed strip.

As may be appreciated, depending on the thickness of the strip material being subjected to reforming, the collars 66 are raised and lowered. Normally, once the knife blades are preset no changes are necessary. Additionally, the heating assembly 16 may be changed by removing the upper and lower heating block assemblies 76, 72, and replacing them with assemblies having a different number of knife blades or at different positions. It is possible to include a relatively large number of vertical slots in the blocks for bearing knife blades and utilizing selected ones of the same. In that case, localized heating along narrow longitudinal lines of the thermoplastic material strip 12 passing therethrough may be readily accomplished by removing, adding or laterally shifting the position of the opposed pairs of knife blades 94, 122. Further, it is preferred that opposed knife blades are employed rather than a knife blade such as 94 within the lower heating block assembly 72 and the absence of a knife blade as at 122 within the upper heating block assembly 76. The use of two knife blades and two heating block assemblies insures rapid localized heating of the strip passing therethrough from both sides thereof to permit the unit to operate at higher speed and to effect a more uniform, rapid heat softening at the localized line areas 12b of the strip 12.

Figure 3A:
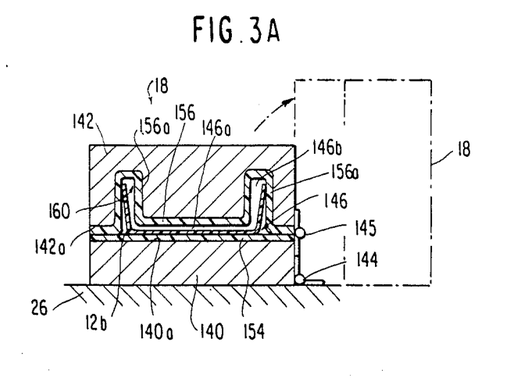
FIGS. 3A and 3B are transverse sectional views of alternate embodiments of the forming guide of the apparatus of FIG. 1, taken about line III—III.

As the thermoplastic material strip 12 leaves the heating assembly 16, it immediately enters a forming guide or prebending device 18 at station C which is shown as being spaced downstream slightly form the downstream end of heater assembly 16, although it may be much closer thereto. The prebending device 18 is of relatively short length and may be of a width slightly wider than the strip 12 passing therethrough. Further, it may be formed of a thermal insulative material or of a heat conductor. As shown in FIG. 3A in one embodiment, it is comprised of a lower block half 140 and an upper block half 142. The illustrated device is purposely of simplified form. A first hinge 144 pivotally mounts the lower block to table top 26 at one corner, and a second hinge 145 pivotally connects the upper block 142 to the underlying block 14 on the same side. The opposed block halves are provided with facing surfaces 140a and 142a, respectively. Face 142a carries a U-shaped cross-section recess or groove 146. Lower PTFE liner 154 and upper PTFE liner 156, respectively line faces 140a, 142a. Upper PTFE liner 156 conforms to the upper block U-shaped groove 146. The PTFE liner 154 is a flat strip of rectangular form. Groove 146 includes a base portion 146a and right angle legs 146b at opposite ends. The PTFE liner 156 has projection 156a sized to the respective groove legs 146b, which legs receive the same. The PTFE liners 154, 156, define a U-shaped passageway, indicated generally 160 which causes the desired preform shape of the strip 12 to occur as it leaves the heating station A forcing the edges of the strip 12 to turn up at both sides and the strip 12 into U-shaped configuration at the heat-softened localized line areas 12b, FIG. 2. Further, the dimensions of the U-shaped passageway 160 are in excess of the width and thickness of the thermoplastic material strip so that the prebending device 18 does not bend the strip 12 to any specific tolerance but rather initiates the bending so that the strip material will fit into and conform to the downstream chilled forming die 20. Device 18 is used only when changing reels 14. When not in use the prebending device 18 may be flipped on its side as shown in dotted lines in FIG. 3A.

Figure 4A:
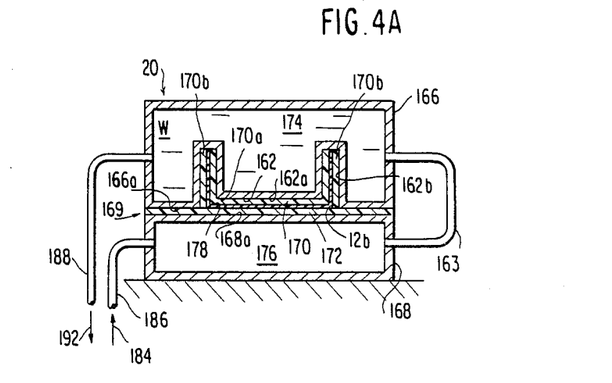
FIGS. 4A and 4B, are vertical sectional views of alternate embodiments of the chilled forming die of the apparatus of FIG. 1, taken about line IV—IV.

Referring next to FIGS. 1 and 4A, it may be appreciated that one embodiment of the chilled forming die indicated generally at 20 at station D receives the thermoplastic material strip 12 in pre-bent shape nearly conforming to its final shape. The chilled forming die 20 is considerably longer than the short length prebending device 18 and has strict tolerances. The chilled forming die 20 is in some respects similar to that of the forming guide 18 in that it consists of upper and lower blocks bearing PTFE liners or inserts. However, in this case, its function is to rapidly chill the heat-softened line areas 12b of the strip 12 as it passes therethrough while closely confining the plastic strip during its passage through the elongated chilled forming die. The blocks are hollow to carry a coolant liquid such as water. Because of the cold and increased pressure on the sidewall, the plastic takes on the shape of the inside of the PTFE die liners and "freezes" in that position.

As seen best in FIG. 4A, the chilled forming die 20 in the example shown is an assembly of upper and lower hollow metal dies blocks 166 and 168, respectively, fixably mounted to the top of table 26. The blocks 166, 168 form a die assembly indicated generally at 169. The blocks 166 and 168 are of rectangular cross-section and are of a length several times in excess of the width of these blocks. They are formed of a heat conductive metal, are thin walled and have facing surfaces as at 166a, 168a, respectively. Further, within block 166 at surface 166a there is provided a U-shaped recess 162 formed of a flat base portion 162a and right angle, upright legs 162b. Surface 168a of lower block 168 is covered with a thin PTFE strip or liner 172. The U-shaped recess or groove 162 is lined by an upper PTFE liner 170 defined by two vertical sections 170b and a U-shaped section 170a. The liners 170, 172 extend the full length of blocks 166. Hollow blocks 166, 168 define an upper cooling chamber 174 and lower cooling chamber 166, respectively. The chambers 174 and 176 are sealed from each other except for a connecting loop or conduit 163 so that the coolant such as water W may circulate freely between the chambers. In the illustrated embodiment, the PTFE liners 170, 172 are shown as having appreciable thickness and define therebetween a U-shaped die opening or passage indicated generally at 178 for the preformed stock strip 12 with full surface contact between the strip 12 and the PTFE liners 170, 172. The chilled forming die assembly 169 preferably has frigid water W flowing through it at all times to keep the fixture cold. This insures complete freezing or the solidification of the heat-softened thermoplastic material strip 12 along bend lines 12b and the restoration of the memory to the thermoplastic material strip 12 so as to maintain its sharp folds and U-shaped configuration upon exiting from the chilled forming die 20 at station D. Coolant circulates through the hollow chambers 174 and 176 of the upper and lower die blocks or sections 166, 168 of the chilled forming die 20. The chill water W, as indicated by arrow 184, enters the lower chamber 176 via inlet pipe 186 at one end and to one side, and leaves such chamber via pipe or loop 162 with the chill water preferably circulated to the opposite side from loop 163 which connects to upper chamber 174. The water W leaves the upper chamber 174 via return pipe 188 as shown by arrow 192 and includes a pump (not shown) for effecting circulation and a heat exchanger (not shown) for removing heat therefrom. Such aspects of the apparatus 10 of FIG. 1 are standard within the art and form no content of the present invention.

As further seen in FIG. 1, the narrow reformed strip 12 with its exact right angle sharp folds exists from the downstream end of the chilled forming die 20 and passes from the forming station C to a blanking and cutting station D. At that station, the blanking and cutting assembly 22 is shown in schematic form as being constituted by a lower fixed cutting and blanking die 190 underlying an upper reciprocating cutting and blanking die 192. Die 192 may include a downwardly projecting cutting blade 194. The reformed strip 12 passes between the dies 190 and 192 when opened as shown. Periodically the upper die 192 is sharply driven in the direction of lower die 190 so that the blade 194 severs the strip into sections or lengths defined by the distance travelled by the strip prior to severance by blade 194. In the schematic drawing FIG. 1, a stand 196 is provided with legs 198 straddling the lower die 190 with the stand including a horizontal top 200 supporting an underlying vertical electromagnetic coil 202. The coil is energized by a source of electrical energy (not shown). The coil 202 carries a magnetic armature 206 mounted for reciprocation and fixably coupled at the lower end to the center of the upper die 192. Physically interposed between the stand top 200 and the headed end 206a of armatures 206 is a coil spring 208 which normally retracts the blade 194 of upper die 192 from the lower die 190. However, upon the energization of coil 202, the upper die 192 is driven from the position shown against the bias of the compression coil spring 208, such that knife blade 194 enters slot 190a of lower die 190. Thus in order to sever the strip 192 after forming in to sections, as at 12a, FIG. 1, 5A the coil 202 is is momentarily periodically energized to drive the upper die 192 downwardly forcing the die blade 194 to sever the strip material into sections.

Alternatively, longitudinally spaced knife blades may be employed to achieve cutting of both ends of the formed strip into pieces or sections during drop of upper die 192. Further, the blanking and cutting assembly 22 may take any suitable form capable of effecting a given desired result. This, of course, may depend upon the exact configuration necessary for the severed, reformed strip sections, as at 12a, FIG. 1. In FIG. 5A, the thermoplastic strip section 12a is of a U-shaped configuration having sharp, right angle bends wherein laterally opposed right angle legs or arms 4 extend from base 6.

As stressed previously, the apparatus and method of the present invention have particular applicabillity to the formation of transparent or translucent thermoplastic sheet or strip material end caps and in particular for achieving longitudinal bends by limiting the softening of the thermoplastic strip material to narrow parallel lines 12B and forming sharp folds by passage at high speed of the thermoplastic material strip 12 through the heating assembly 16, the prebending device 18 and the chilled forming die 20, having "PTFE" surfaces in contact with the transparent thermoplastic material stock strip passing therethrough. The result is the achieving of reformed longitudinally folded strip material which is subsequently severed to form strip sections as end caps or other packaging components without marring or scratching the surface of the strip material during reforming.

Due to the employment of Teflon blocks in contact with the strip material during heating, prebending and chill die forming, the somewhat fragile thermoplastic material strip is subject to minimum stress and surface abrasion during all operations while the machine operates on either a continuous or stop and go, stepped basis to accommodate the severing of the strip into segments at relatively high speed. The sharp bends resulting therefrom insure the rigidity of the folded strip which is particularly useful in forming closure or end cap components of thermoplastic sheet material packages. The finished products are relatively inexpensive and the method and apparatus is simplified relative to prior art methods and apparatus employed in the creation of similar packaging components.

Figure 3B:
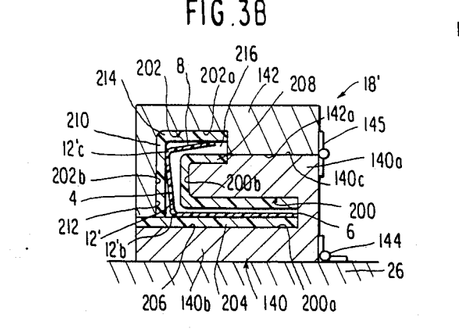
Figure 4B:
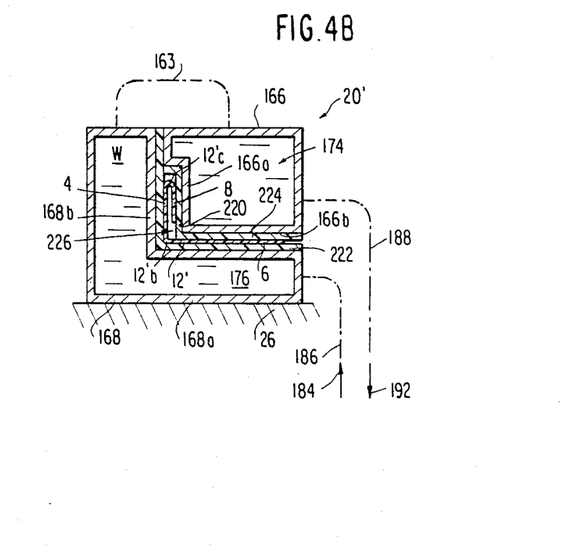

Reference to FIG. 5B shows a section 12a of a reformed stock strip which includes a sharp bend formed by a second embodiment of the invention in which the prebending device 18 and the chilled forming die 20 are of modified form, as seen specifically in FIGS. 3B and 4B, respectively. A minor change may be made to the heating device 16, limited to a slightly different lateral positioning of the knife blades 94, 122 for the lower and upper heating blocks of that device of the apparatus shown in FIG. 1. In the alternate embodiment, this results in the formation of a reformed stock strip, as at 12', FIG. 5B. Like elements bear like numerical designations in FIGS. 3B, 4B. From FIG. 5B it is seen that the reformed stock strip, prior to cutting into sections or segments at station D, includes a base 6, but includes a single leg 4 to one side thereof formed by a sharp right angle bend at 12'b along that side, and the reformed stock strip further includes a reverse or 180° bend along fold line 12'c at the top of the leg 4 to produce a folded over and downwardly projecting edge 8.

To achieve that end, the stock strip 12' is heat softened along longitudinal fold lines 12'b and 12'c and the leading end of the stock strip 12' is fed to the modified form prebending unit 18', FIG. 3B. In a similar manner to the embodiment of FIG. 3A, the prebending device 18' is comprised of a lower metal block 140 which is hinge mounted to table top 26 by way of a first hinge 144 at the lower right side corner of that block. Further, an upper block 142 is hinge mounted to the lower block on the same side by way of hinge 145 so that the opposing faces 140a and 142a, of respective lower and upper blocks 140, 142, can pivot 180 degrees from the closed position shown to a fully open position. Unlike the embodiment of FIG. 3A, the blocks are L-shaped and there are recesses formed within both blocks 140 and 142. The lower block 140 is provided with a L-shaped recess, indicated generally at 200, having a horizontal base portion 200a and a right angle vertical portion 200b. The L-shaped recess is formed within the lower block 140 from the side opposite that of hinge 144.

The upper inverted L-shaped block 142 is provided with an inverted L-shaped recess over its full length, indicated generally at 202, including a horizontal portion 202a and a vertical portion 202b. For the upper block 142, the inverted L-shaped recess is on the left side of the block. A C-shaped recess 200 is formed within the left side of lower block 140 and recess 200 is lined with two separate PTFE liners or strips over the longitudinal length of the prebending device 18'. A lower PTFE liner 204 is affixed to face 206 of the lower portion 140b of lower block half 140 and a C-shaped PTFE liner 208 is fitted about the upper portion 140a of the lower block half 140 so as to facilitate lining the confronting surfaces between the lower block half and C-shaped locally heated, stock strip 12'. A single inverted L-shaped strip or liner of PTFE material 210 is fitted to right angle vertical and horizontal confronting surfaces 212, 214 of the upper block half 142. The confronting, spaced PTFE strips 204, 208 and 210 define a short length, C-shaped prebending passageway 216 which receives and loosely prebends the line heat softened stock strip 12' causing it to take the initial configuration shown in FIG. 3B with dual fold lines 12'b and 12'c being generally at right angles causing adjacent portions of the strip stock 12' to be generally at right angles to each other. Corresponding to the embodiment of FIG. 3A, the hinges 144, 146 of the prebending device 18' initially permit, with the lower block half 140 contacting the face of the table top 26, the upper block 140 to be flipped 180° from that shown in FIG. 3B, to permit the insertion of the line heated strip stock 12' into a position such that an edge of the strip stock can be positioned between vertically spaced Teflon strips 204, 208, thus the stock strip 12' can then be bent about the C-shaped PTFE strip 208. Rotating the upper block half 142 to the position shown in FIG. 3B causes prebends to the stock strip 12' about the first and second heat softened fold lines 12'b and 12'c. A further 90° bend is given to the edge 8 of the leg of the stock strip 12' and is achieved as the stock strip 12' enters and passes through the chilled forming die 20', FIG. 4B. It should be kept in mind that in similar fashion to the embodiment of FIG. 3A, the prebending device 18' may be flipped 90° from the position shown in FIG. 3B to the side of the path of movement of the stock strip 12' from heating assembly 16 to chilled forming die 20'. After heating, once the lead end of the stock strip extends through the chilled forming die 20' it is forcibly drawn through the apparatus as per FIG. 1 by the rollers 49, 50, nipping the leading end of the stock strip and during energization of the motor M. Release of the stock strip 12' from the prebending device 18' is achieved by first flipping the upper block half 180° from the position shown in FIG. 3B about the axis of the upper hinge 146 and then after release of the stock strip 12', the pivoting of the lower block half 140, 90° to the right side of the table 26 about the axis of the lower hinge 144 (in the manner seen in dotted lines, FIG. 3A for device 18). The PTFE members 204, 208, and 210 function as liners in the manner of the embodiment of FIG. 3A.

Referring next to FIG. 4B, that figure shows the basic elements of the alternate form of chilled forming die 20' (in solid lines, with the cooling circuit shown schematically by dotted lines) for the coolant circulating between respective upper and lower chambers 174, 176. Again, the chilled forming die 20' consists of an assembly of upper and lower hollow metal die blocks 166, 168, respectively. The lower hollow metal die block 168 is of L-shaped configuration including a horizontal base portion 168a fixedly mounted to the table top 26. The upper hollow metal die block 166 is of generally rectangular cross section but is provided with a step 166a, forming a recess 220 in the side thereof facing vertical leg 168B of lower hollow metal die block 168. An L-shaped PTFE strip or liner 222 covers the surfaces of the lower hollow metal die block 168 facing the rectangular upper hollow metal die block 166. Further, a second PTFE strip or liner 224, of modified L-shaped configuration, covers recess 220 and the lower face 166b of the upper hollow metal die block 166. The PTFE strips or liners 222, 224 define therebetween a L-shaped die opening or passage indicated generally at 226 for reformed stock strip 12' with essentially full surface contact between the strip 12 and the Teflon liners 222, 224. The edge 8 of the vertical leg 4 of the reformed stock strip 12' is bent over a full 180° about the upper fold line 12'c while leg 4 and the base 6 of the stock strip 12' are at right angles to each other, being bent about the lower fold line 12'b. Both folds are very sharp and upon passage of the stock strip 12' through the chilled forming die 25 a relatively rigid L-shaped reformed strip results.

As seen in FIG. 5B, that strip is severed into segments or sections as at 12' to meet the commercial need, in lengths dependent upon the timing in reciprocation of the knife blade 194 at station D. Again the sharp bends result in providing a high rigidity to the folded stock strip 12' making it particularly useful in forming closure or end cap components of thermoplastic sheet material packages.

While the invention has been described in detail with respect to specific embodiments thereof, it will be apparent to one skilled in the art that modifications and changes can be made therein without departing from the spirit and scope thereof.

What is claimed is:

1. In an apparatus for forming longitudinally folded thermoplastic material stock strip comprising a feed stand supporting a roll of thermoplastic material stock strip, a feed mechanism for gripping a free end of the thermoplastic material stock strip and continuously feeding it in the longitudinal direction of the strip, a heating assembly receiving said thermoplastic material stock strip and including a means for heating at least portions of said stock strip to a temperature sufficient to heat soften the thermoplastic material, a means downstream of said heating assembly for progressively folding said heat softened flat thermoplastic material stock strip into lengthwise folded form having at least one substantially sharp fold and means for maintaining the lengthwise folded thermoplastic material stock strip in folded condition by holding and pressing the stock strip while cooling the stock strip to set the fold, the improvement wherein;

said heating assembly comprises fixed upper and lower knife blades in longitudinal alignment with and respectively above and below said stock strip and sandwiching the stock strip therebetween with the opposed surfaces of the stock strip in light contact with respective knife blade edges, means for heating respective knife blades such that said stock strip is heat softened along said narrow longitudinal areas on opposite sides of the stock strip to maximize the heat softened effect so as to permit the stock strip to be moved at relatively high speed through the heating assembly, and to thereby define a localized longitudinal fold line for said stock strip.

2. The apparatus as claimed in claim 1, wherein said at least one knife blade is PTFE coated, at least on said edge contacting said stock strip surface.

3. The apparatus as claimed in claim 1, wherein at least the edges of said knife blades are PTFE coated.

4. The apparatus as claimed in claim 1, wherein said means for progressively folding said heat softened flat stock strip comprises a prebending device positioned at the outlet end of said heating assembly and comprising a block, a PTFE coated passage within said block defining a rough die opening having two portions at an angle to each other receiving respective portions of said stock strip and sized in excess to the dimensions of the stock strip passing therethrough such that said prebending device causes said stock strip to fold along said heat softened localized longitudinal fold lines while the PTFE prevents abrasion of the surfaces of the stock strip passing therethrough during prefolding.

5. The apparatus as claimed in claim 1, wherein, said means for maintaining the stock strip in folded condition by holding and pressing the stock strip while cooling the stock strip to set the fold comprises a chilled forming die comprising at least one elongated metal hollow block, means for circulating a chilling fluid through said hollow block to reduce the temperature thereof and to extract heat from the thermoplastic stock strip passing therethrough and wherein said at least one hollow block comprises at least one PTFE lined die opening therein receiving said lengthwise folded thermoplastic material strip after passage through said prebending device with the die opening therein sized closely to the dimensions of the stock strip and having a configuration corresponding to the desired sharp refold configuration of lengthwise folded stock strip whereby, due to surface contact between the PTFE lined chilled forming die and said stock strip passing therethrough, said lengthwise folded stock strip is cooled sufficiently to set the fold or folds thereof sharply without abrasion to the surface of the stock strip passing therethrough.

6. The apparatus as claimed in claim 1, wherein said heating assembly comprises an elongated planar base plate of rectangular cross section, a pair of laterally spaced guide posts fixably mounted to the base plate and rising vertically therefrom at respective opposite ends of said base plate, an upper plate having a pair of laterally spaced vertical bores passing therethrough at each end thereof sized slightly larger than the diameter of the guide posts and slidably receiving the upper ends of said guide posts, a collar adjustably fixed to each said post below said upper plate, a lower heating block fixably mounted at the center of said planar base plate and extending in the strip longitudinal direction of movement an upper heating block assembly fixably mounted to the bottom of the upper plate and facing the lower heating block assembly, each heating block assembly comprising an elongated metal block, at least one narrow, metal knife blade carried respectively by said upper and lower heating blocks, said knife blades facing each other and extending longitudinally, said stock strip passing therebetween and having opposite faces contacting said knife blades and means for heating the blocks of said upper and lower heating block assembly such that with said collars adjustably fixed on said guide posts and opposite faces of said stock strip in contact with respective blade edges the strip is heated along localized longitudinal lines as said strip is moved relatively friction free between said upper and lower heating block assemblies and without surface scratching as a result of said relative movement.

7. The apparatus as claimed in claim 6, wherein at least one facing surface of said upper and lower heating blocks is longitudinally grooved and a PTFE insulator and guide strip is mounted within said heating block groove, and wherein the PTFE insulator and guide strip is slotted such that a knife blade for said block projects through said PTFE insulator and guide strip for contact with said interposed stock strip to locally heat said stock strip from one side thereof as a result of strip surface contact with said knife blades.

8. The apparatus as claimed in claim 7, further comprising a bore hole within respective blocks and an electric heating element positioned within each bore hole for heating respective blocks and for transmitting heat to said at least one knife blade carried by each block.

9. The apparatus as claimed in claim 7 wherein at least one of said block and said PTFE insulator and guide strip comprises two laterally spaced parallel narrow vertical slots extending in the longitudinal direction of movement said stock strip, and to one side thereof, a knife blade is fixedly mounted within each of said aligned slots parallel to the direction of movement of said strip, transverse bores within said one block intersect respective narrow vertical slots from opposite sides of said block, and roll pins carried by said transverse bores bear respectively on opposite sides of said knife blades for holding said knife blades fixedly in place with projecting edges of said knife blades contacting said stock strip surface.

* * * * *